US012739103B2

(12) United States Patent
Azouaoui et al.

(10) Patent No.: US 12,739,103 B2
(45) Date of Patent: Sep. 15, 2026

(54) CRYPTOGRAPHIC AGILITY

(71) Applicant: NXP B.V., Eindhoven (NL)

(72) Inventors: Melissa Azouaoui, Norderstedt (DE); Christoph Baumann, Graz (AT); Florian Boehl, Leuven (BE); Joppe Willem Bos, Wijgmaal (BE); Gareth Thomas Davies, Leuven (BE); Sarah Esmann, Hamburg (DE)

(73) Assignee: NXP B.V., Eindhoven (NL)

( * ) Notice: Subject to any disclaimer, the term of this patent is extended or adjusted under 35 U.S.C. 154(b) by 62 days.

(21) Appl. No.: 18/612,117

(22) Filed: Mar. 21, 2024

(65) Prior Publication Data

US 2025/0300812 A1 Sep. 25, 2025

(51) Int. Cl.
*H04L 9/08* (2006.01)

(52) U.S. Cl.
CPC ............ *H04L 9/0825* (2013.01); *H04L 9/085* (2013.01)

(58) Field of Classification Search
CPC .............................. H04L 9/0825; H04L 9/085
See application file for complete search history.

(56) References Cited

U.S. PATENT DOCUMENTS 11,593,488 B2 2/2023 Wentz
12,177,338 B2 * 12/2024 Van Vredendaal ... H04L 9/0894
2013/0318357 A1 * 11/2013 Abraham ................ G06F 21/64 713/168
2017/0214662 A1 * 7/2017 Chu ...................... H04L 9/0869
2018/0217828 A1 * 8/2018 Madrid ................. H04L 9/3247
2022/0069984 A1 * 3/2022 Ahn .......................... H04L 9/14
2023/0098090 A1 * 3/2023 Barui .................... H04L 9/3247 713/176
2023/0246826 A1 8/2023 Van Vredendaal

FOREIGN PATENT DOCUMENTS

EP 4160980 A1 9/2021
EP 4020435 A1 6/2022
EP 4160982 A1 9/2022
EP 4068686 A1 10/2022
WO 2022/211899 A1 10/2022

OTHER PUBLICATIONS

Fabio Campos et al., "LMS vs XMSS: Comparison of Stateful Hash-Based Signature Schemes on ARM Cortex-M4," AFRICACRYPT 2020, LNCS 12174, pp. 258-277, 2020.
Hans Georg Shaathun, et al., "A Trellis-Based Bound on (2,1)-Separating Codes," Conference Paper in Lecture Notes in Computer Science, Dec. 2005.

(Continued)

*Primary Examiner* — Beemnet W Dada

(57) ABSTRACT

A method for updating a device, including: receiving, by the device, a public one-time signature key; receiving, by the device, a secret encryption key; receiving an encrypted update package and signature from an update provider; verifying the signature using the public one-time signature key; decrypting the encrypted update package using the secret encryption key; and updating the device using the decrypted update package.

18 Claims, 4 Drawing Sheets

(56) References Cited

OTHER PUBLICATIONS

Sanotsh Ghosh, et al., "Lightweight Post-Quantum-Secure Digital Signature Approach for IoT Motes," Security and Privacy Research, Intel Labs, Intel Corporation.
David McGrew, et al., "State Management for Hash-Based Signatures".
Roberto Roman, et al., "A Lightweight Remote Attestation Using PUFs and Hash-Based Signatures for Low-End IoT Devices," Future Generation Computer Systems 148, 2023, pp. 425-435, Jun. 8, 2023.
Santosh Ghosh, et al., "Intelligent IoT Motes: Preventing Their Abuse at the Weakest Entry Point," Mar./Apr. 2019, IEEE 2168-2356/19.
Jean-Philippe Aumasson, et al., "SPHINCS+ submission to the NIST post-quantum project, v.3", 2020.
Roberto Avanzi, et al., "CRYSTALS-kyber algorithm specifications and supporting documentation (version 3.02)", 2021.
Ward Beullens, "Breaking Rainbow takes a weekend on a laptop", Advances in Cryptology—CRYPTO 2022—42nd Annual International Cryptology Conference, CRYPTO2022, Santa Barbara, CA, USA, Aug. 15-18, 2022, Proceedings, Part II (YevgeniyDodis and Thomas Shrimpton, eds.), Lecture Notes in Computer Science, vol. 13508, Springer, 2022, pp. 464-479.
Wouter Castryck and Thomas Decru, "An efficient key recovery attack on SIDH," Advances in Cryptology—EUROCRYPT 2023—42nd Annual International Conference on the Theory and Applications of Cryptographic Techniques, Lyon, France, Apr. 23-27, 2023, Proceedings, Part V (Carmit Hazay and Martijn Stam, eds.), Lecture Notes in Computer Science, vol. 14008, Springer, 2023, pp. 423-447.
David A. Cooper, et al., "NIST Special Publication 800-208: Recommendation for stateful hash-based signature schemes," 2020.
C. Dods, et al.,, "Hash based digital signature schemes," Cryptography and Coding, 10th IMA International Conference, Cirencester, UK, Dec. 19-21, 2005, Proceedings (Nigel P. Smart, ed.), Lecture Notes in Computer Science, vol. 3796, Springer, 2005, pp. 96-115.
Léo Ducas, et al., "CRYSTALS-Dilithium algorithm specification and supporting documentation (version 3.1)", 2021.
Pierre-Alain Fouque, et al., "Falcon: Fast-fourier lattice-based compact signatures over NTRU specification v1.2" Jan. 10, 2020, 2020.
Andreas Huelsing, et al., "XMSS: extended Merkle Signature Scheme," RFC 8391, May 2018.
David McGrew, Michael Curcio, and Scott Fluhrer, Leighton-Micali Hash-BasedSignatures, RFC 8554, Apr. 2019.
National Institute of Standards and Technology, Post-quantum cryptography: Digital signature schemes, https://csrc.nist.gov/Projects/pqc-dig-sig/signaturesround-1-additional.
Post-quantum cryptography standardization, https://csrc.nist.gov/Projects/Post-Quantum-Cryptography/Standardization.Post-Quantum-Cryptography.

* cited by examiner

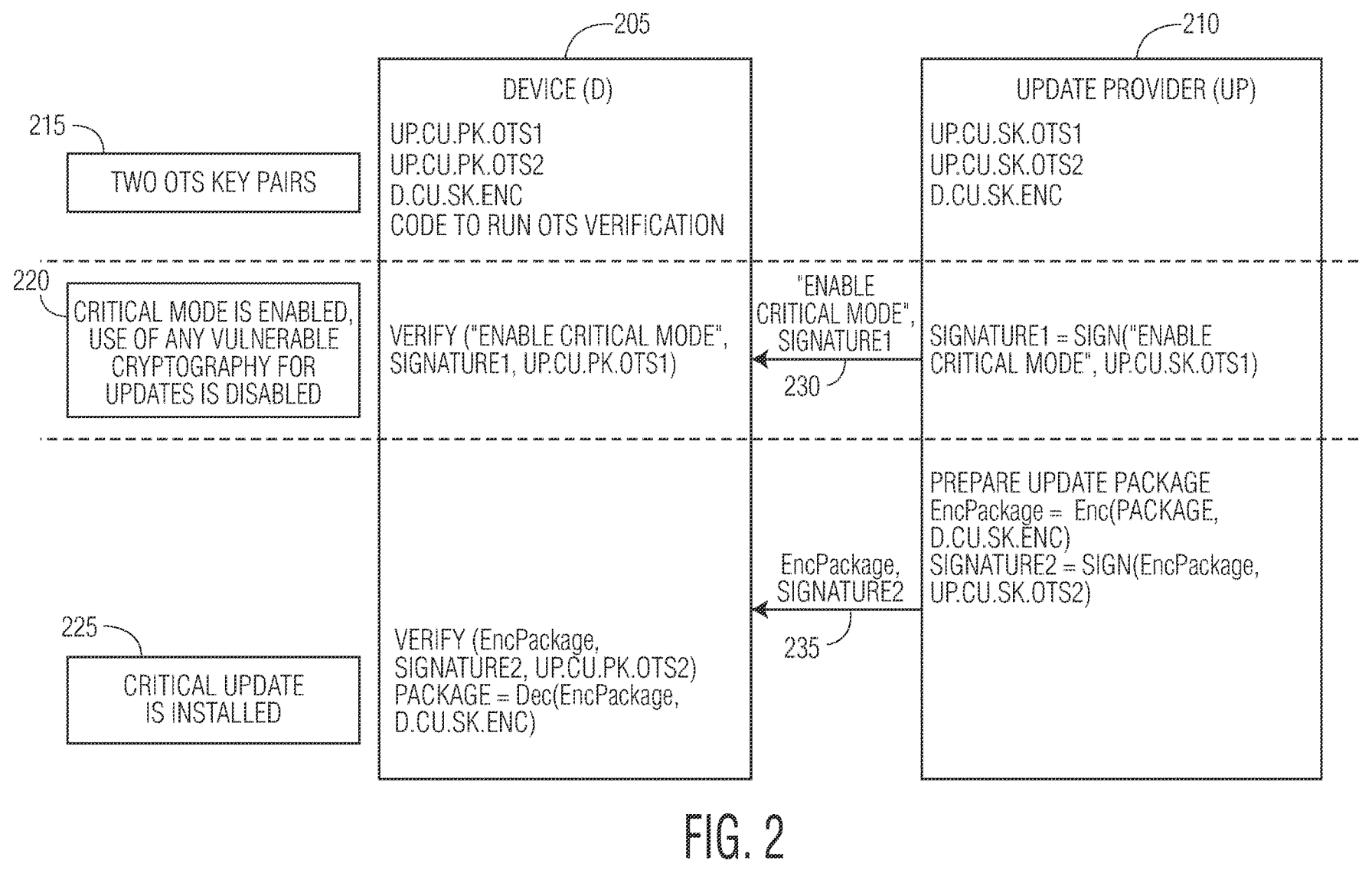

215
TWO OTS KEY PAIRS

205
DEVICE (D)
UP.CU.PK.OTS1
UP.CU.PK.OTS2
D.CU.SK.ENC
CODE TO RUN OTS VERIFICATION

210
UPDATE PROVIDER (UP)
UP.CU.SK.OTS1
UP.CU.SK.OTS2
D.CU.SK.ENC

220
CRITICAL MODE IS ENABLED, USE OF ANY VULNERABLE CRYPTOGRAPHY FOR UPDATES IS DISABLED

VERIFY ("ENABLE CRITICAL MODE", SIGNATURE1, UP.CU.PK.OTS1)

230
"ENABLE CRITICAL MODE", SIGNATURE1

SIGNATURE1 = SIGN("ENABLE CRITICAL MODE", UP.CU.SK.OTS1)

225
CRITICAL UPDATE IS INSTALLED

VERIFY (EncPackage, SIGNATURE2, UP.CU.PK.OTS2)
PACKAGE = Dec(EncPackage, D.CU.SK.ENC)

235
EncPackage, SIGNATURE2

PREPARE UPDATE PACKAGE
EncPackage = Enc(PACKAGE, D.CU.SK.ENC)
SIGNATURE2 = SIGN(EncPackage, UP.CU.SK.OTS2)

FIG. 2

CRYPTOGRAPHIC AGILITY

FIELD OF THE DISCLOSURE

Various exemplary embodiments disclosed herein relate to cryptographic agility.

BACKGROUND

The field of quantum computing has seen significant recent advances, providing significantly increased attention for the design and implementation of cryptographic schemes that resist attacks from sufficiently powerful quantum computers. These worldwide efforts have led to the development of many candidate schemes based on mathematical assumptions that are thought to avoid some of the cryptanalytic speed-ups that arise when using quantum computing. These secure post-quantum cryptography (PQC) schemes are in general much less mature than the cryptography that is widely deployed today (such as ECC and RSA), and in turn these candidate PQC schemes do not garner the same confidence (in terms of their security level) than the existing traditional algorithms.

SUMMARY

A summary of various exemplary embodiments is presented below.

Various embodiments relate to a method for updating a device, including: receiving, by the device, a public one-time signature key; receiving, by the device, a secret encryption key; receiving an encrypted update package and signature from an update provider; verifying the signature using the public one-time signature key; decrypting the encrypted update package using the secret encryption key; and updating the device using the decrypted update package.

Various embodiments are described, further including; provisioning the device with a secret seed; and reserving code space in the device for key generation using the secret seed.

Various embodiments are described, further including; provisioning code to run a one-time signature verification in the device.

Further various embodiments relate to a method for updating a device by an update provider, including: sending, by the update provider, a public one-time signature key to the device; sending, by the update provider, a secret encryption key to the device; encrypting an update package using the secret encryption key; producing a signature of the encrypted update package using a secret one-time signature key; and sending the encrypted update package and signature to the device.

Further various embodiments relate to a method for updating a device, including: receiving, by the device, a first public one-time signature key and a second public one-time signature key; receiving, by the device, a secret encryption key; receiving an update mode message and a first signature; verifying the first signature using the first one-time signature key; receiving an encrypted update package and a second signature from an update provider; verifying the second signature using the second public one-time signature key; decrypting the encrypted update package using the secret encryption key; and updating the device using the decrypted update package.

Various embodiments are described, further including: receiving code to run a one-time signature verification from the update provider.

Further various embodiments relate to a method for updating a device by an update provider, including: sending a first public one-time signature key and a second public one-time signature key to the device; sending a secret encryption key to the device; producing a first signature of an update mode message using a first secret one-time signature key corresponding to the first public one-time signature key; sending the update mode message and a first signature to the device; encrypting an update package using the secret encryption key; producing a second signature of the encrypted update package using a second secret one-time signature key corresponding to the second public one-time signature key; and sending the encrypted update package and signature to the device.

Further various embodiments relate to a method for requesting a certificate by an updated device, including: receiving, by the updated device, a public certification authority signature key; receiving, by the device, a secret one-time signature key; generating a new updated device secret key and public key; producing a signature request for the new updated device public key; producing a first signature of the signature request using the secret one-time signature key; sending the signature request and first signature to a certification authority; and receiving a certificate including a signature of the certificate from the certification authority.

Various embodiments are described, further including; provisioning the device with a secret seed; and reserving code space in the device for key generation using the secret seed.

Various embodiments are described, further including; provisioning code to run a one-time signature verification in the device.

Various embodiments are described, wherein the first signature is based on a secret certification authority signature key.

Further various embodiments relate to a method for generating a certificate for an updated device, including: sending a public certification authority signature key to the updated device; sending a secret one-time signature key to the updated device; receiving a certificate request for a new updated device public key and a first signature for the certificate request from the device, wherein the first signature is based on the secret one-time signature key; verifying the first signature and the certificate request; producing a certificate for the new updated device public key including a signature of the certificate using a secret certification authority signature key corresponding to the public certification authority signature key; and sending the certificate and second signature to the updated device.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 2 illustrates a two stage update system and method.

DETAILED DESCRIPTION

Figure 1:
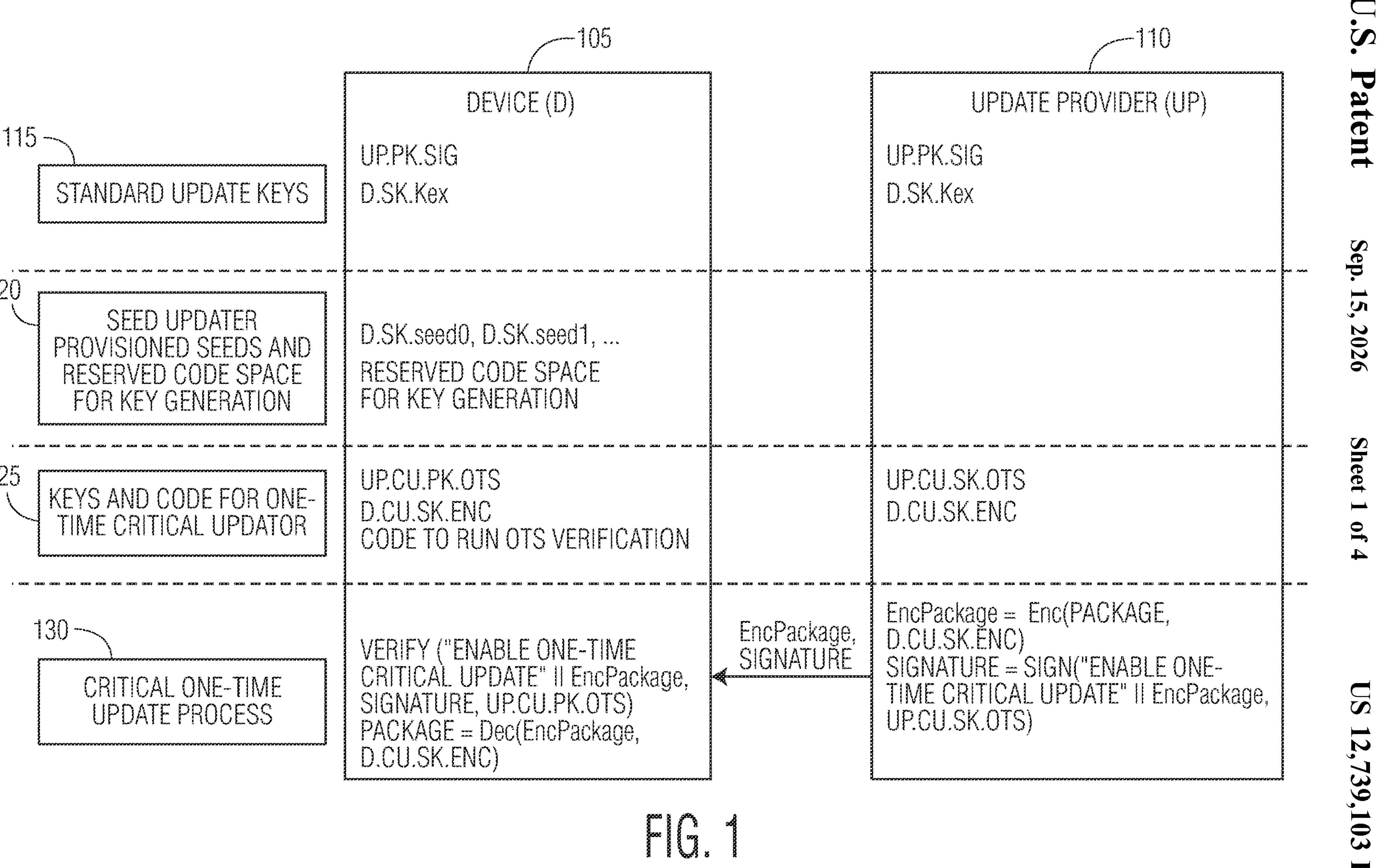
FIG. 1 illustrates the impact of the update mechanism on the device to be updated and the general process of the one-time critical update.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of cryptographic systems and methods will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

The field of quantum computing has seen significant recent advances, providing significantly increased attention for the design and implementation of cryptographic schemes that resist attacks from sufficiently powerful quantum computers. These worldwide efforts have led to the development of many candidate schemes based on mathematical assumptions that are thought to avoid some of the cryptanalytic speed-ups that arise when using quantum computing. These secure post-quantum cryptography (PQC) schemes are in general much less mature than the cryptography that is widely deployed today (such as ECC (elliptic curve cryptography) and RSA (Rivest-Shamir-Adelson)), and in turn these candidate PQC schemes do not garner the same confidence (in terms of their security level) than the existing traditional algorithms.

Deploying post-quantum cryptography is fraught with challenges: increased memory/bandwidth requirements of the schemes, lack of drop-in replacements for certain protocols, and the difficulty of ensuring backwards compatibility to name but a few. The relative lack of confidence in the security of the PQC schemes means that many vendors may wish to have a contingency plan in place in case one or more of these new schemes suffer new breakthroughs in terms of cryptanalysis.

In this disclosure a method is descripted for securely performing a critical update procedure, where one or more cryptographic algorithms—including the ones that underpin the update procedure itself—are replaced in a manner that incurs low overhead in terms of storage and bandwidth through the use of one-time signatures. To augment this process, a number of additional elements are described that can optionally be used alongside the invention to smooth the transition process including increasing flexibility by enabling multiple critical updates, attesting to freshly generated keys, bootstrapping the critical update mechanism to securely load data into non-volatile memory, and thwarting advanced attackers that attempt to compromise the device before the update has been provided.

Recent significant advances in quantum computing have accelerated the research into PQC schemes that include cryptographic algorithms that run on classical computers but are believed to be still secure even in the presence of an adversary with access to a quantum computer. This demand is driven by interest from standardization bodies such as the call for proposals for new public-key cryptography standards by the National Institute of Standards and Technology (NIST). The first selection procedure for new cryptographic standards has ended and the lattice-based schemes Kyber, Dilithium, and FALCON, along with the hash-based scheme SPHINCS+ have been selected by the NIST as the future standards for post-quantum cryptography. The stateful hash-based schemes XMSS and LMS and their multi-tree variants were previously standardized by the NIST.

In addition to the standardized or selected schemes, the code-based schemes BIKE, HQC, and Classic McEliece remain candidates for selection by the NIST for future PQC algorithms.

The migration process from quantum-vulnerable cryptography such as ECC/RSA to PQC is driving an increasing awareness in the benefits of cryptographic agility, loosely defined as ensuring that cryptographic algorithms and protocols can be replaced with other functionally equivalent components in a timely manner. The systems and methods described herein are motivated by the potential need for replacement of a vulnerable current cryptographic scheme or a vulnerable PQC scheme, however these systems and methods may be used to update any cryptographic component based on urgent functional needs of the system. In particular, it ensures integrity (and if required, confidentiality) of code updates to replace cryptographic component algorithms in a very timely manner, reducing the potential attack window for a capable adversary.

The number of PQC schemes to consider for deployment is extensive compared to past NIST standardization efforts and fuels the need for cryptographic agility when designing new secure systems and devices. One particular difficulty regarding the agility and migration of post-quantum cryptography relates to the risk of potential breaks or dramatic improvements in cryptanalysis of deployed schemes. This is illustrated by the recent breaks of the digital signature scheme Rainbow and the key encapsulation mechanism SIKE: both were candidates in the latter stages of the NIST selection. It is crucial to prepare for the eventual break of the schemes in use and to design mechanisms that either allow for the recovery of vulnerable devices and processes or to securely update or replace the broken cryptographic schemes with non-vulnerable cryptographic schemes.

One main challenge for such a mechanism for embedded/in-field devices is that cryptography (in particular digital signatures) is the cornerstone of any update's security. Hence, if the cryptographic schemes used to verify the integrity (and potentially confidentiality) of the updates are themselves vulnerable, this challenge is a "chicken-and-egg" problem: how do we update a device to use non-vulnerable cryptographic schemes if the cryptographic schemes the device has been programmed to use are vulnerable? Along with this main challenge many questions remain such as if the device's cryptographic keys or schemes it is programmed to use are compromised, how does the device attest to any newly generated keys for use with non vulnerable schemes? How does a user detect if not only keys have been compromised but also if the device has been fully compromised (meaning that an attacker has managed to gain control over the device before the secure update is deployed to patch any vulnerabilities)? The update systems and methods described herein aim to solve the main challenge of maintaining security without relying on vulnerable cryptography, while dealing with some additional challenges of the crypto-agile transition.

A goal of the updater system and methods is to allow for a device to be updated after the cryptographic schemes that it implements are compromised. An update in this specific context will be referred to as a critical update. The updated systems and methods described herein perform such a critical update without using the device's regular update mechanism, which relies on the vulnerable cryptography. The disclosed update systems and methods only marginally impact the footprint of the update mechanism on the device.

The updater systems and methods are based on the following features.

The use of a One-Time Signature (OTS) is proposed and described to perform a one-time critical update. The first benefit of this approach is its small footprint on the device. Only the 56-byte OTS public key is provisioned on the device along with small sized code to perform the verification of the critical update's signature. The verification consists mostly of calls to hash functions which are in many cases already implemented on the device. The second benefit is its reliance on the security of hash functions, which are not known to be vulnerable to quantum computers. This first feature authenticates and protects the integrity of the update. In addition, thanks to this feature a new OTS public key can be sent and signed as part of the update. Thereby, it is possible to use the very simple OTS signature scheme repeatedly, without the need to implement a full-fledged hash-based signature algorithm.

The use of a symmetric key is proposed and described that is provisioned on the device to encrypt and decrypt the one-time critical update. In the standard case, asymmetric key establishment is preferred for encrypted updates, however, in the particular case of the critical update, in order to avoid man-in-the-middle attacks or the update package being sent in the clear, it is proposed to rely on a symmetric key that is reserved for this purpose only. Again, the footprint is small, e.g., a 32-byte key along with a symmetric encryption algorithm such as advanced encryption standard (AES) which in many cases will already be present on the device.

The two previous features may be combined into a single mechanism or used independently of one another. Signatures are usually critical for secure updates (for origin entity authentication and data integrity), but if the confidentiality of the update is not necessary then the second feature can be left out. Other extensions and options of the two previous features are discussed later in this disclosure. Eventually, once the updater system and mechanism described in this disclosure is performed to deploy an update, the derivation of new secret key material for the replacement schemes may be performed according to the seed updater described in U.S. patent application Ser. No. 18/183,310, titled METHOD FOR POST-QUANTUM SECURE IN-THE-FIELD TRUST PROVISIONING, filed Mar. 14, 2023 (the '310 application), the contents of which are hereby incorporated herein by reference for all purposes. To make the transition to the replacement algorithm smoother, three additional mechanisms for use alongside the one-time signature process for critical updates are further described as follows.

First, once new keys for the replacement schemes are generated by the device, it is required to attest to these new keys. By attesting to these keys by linking them to the device's identity, the relevant Certificate Authority (CA) may generate a certificate for the device's new keys. This may be achieved thanks to another feature of this invention by leveraging a OTS again. The device may be provisioned with an OTS secret key that is used for the sole purpose of attesting to its new keys after a critical update. The device will request from the CA a certificate, which is later used to communicate with other devices or services while authenticating the device.

Second, the code for the one-time signatures used in the critical update process can be used as a building block for authenticating loading data into non-volatile memory during the manufacturing process. The idea is to use a stateful hash-based signature scheme such as LMS for authenticating the loaded data, which uses as a subroutine the LM-OTS component which is used for the critical update (this can be done similarly with XMSS and its subroutine WOTS).

The third described feature of this disclosure relates to detecting compromised devices between the break of the used cryptographic schemes and the deployment of the critical update. The idea there is to use a tamper-proof monotonically increasing counter to track the update version. Even if an adversary has compromised the signing keys used for authenticating device updates, the adversary cannot compromise the counter and thus any unauthorized software updates will advance the counter and any critical update made subsequently will be rejected.

FIG. 1 illustrates the impact of the update mechanism on the device to be updated and the general process of the one-time critical update. FIG. 1 illustrates a device 105 and an update provider (UP) 110. SK and PK refer to secret key and public key respectively. Starting from the top of the FIG. 1, the standard update keys 115 include a keypair (UP-.SK.Sig, UP.PK.Sig) that is used for standard updates or updates before the critical update mode is enabled. Multiple key pairs may be used for the purpose of hybrid post-quantum cryptography, i.e., combining two or more schemes, typically one traditional scheme and one post-quantum secure scheme. To keep the description of the updater system and method straightforward, only one key pair (UP.SK.Sig, UP.PK.Sig) is included and referred to even though additional key pairs may be used. The keypair (UP.SK.Sig, UP.PK.Sig) may be ECC, RSA, Dilithium, LMS, XMSS or SPHINCS+ keys or any other public key cryptography protocol keys including non-PQC and PQC protocols. A secret key D.SK.Kex is also provisioned in the device 105 and the public key D.PK.Kex is held by the update provider 110. The corresponding keypair (D.SK.Kex, D.PK.Kex) may be ECC, RSA or Kyber keys or any other public key cryptography protocol keys including non-PQC and PQC protocols. This keypair is used to perform a key establishment to derive a shared symmetric key to encrypt the update.

Next, the previously mentioned seed updater mechanism proposed in the '310 application may be used to provision the device with additional secret seeds to derive key material for any new cryptographic scheme to which the device is updated to use at some point. Other methods for such updating key material may be used as well. In addition, some code space is reserved for key generation. Note that these seeds can be used to derive key material for more than one scheme, for example by using a key derivation function or an extendable output function with appropriate labels and domain separation.

Next FIG. 1 illustrates the setup required for the critical update mode 125. The UP 110 generates a OTS key pair (UP.CU.SK.OTS, UP.CU.PK.OTS) which will be used for the purpose of the one-time critical update. The public key UP.CU.PK.OTS is provisioned on the device 105 along with OTS verification code to verify the critical update's signature. One option to realize such a OTS is using Leighton-Micali One-Time Signatures (LM-OTS) described in IRTF's RFC 8554. In this example, UP.CU.PK.OTS includes 56 bytes but using other key formats or schemes may lead to different key sizes. The verification code has a very small impact on the device because the verification code makes use of the hash algorithm already present on the device 105 and simply computes checksums and hash chains. The symmetric encryption key D.CU.SK.ENC is provisioned on the device 105 to decrypt the update. This key D.CU.SK.ENC may be the same for all devices, or unique to each device or diversified depending on family of devices, users, or other aspects (i.e., the same key is used for specific groups, but the key differs for each group).

When a critical update is required to replace vulnerable cryptographic schemes with non-vulnerable ones 130, the update provider 110 first encrypts the update package using the same symmetric key D.CU.SK.ENC on the target device. Then, the command to enable the one-time critical update mode along with the update package are signed using the OTS secret key UP.CU.SK.OTS. This is done to authenticate the update mode command (which initiates a critical update of the target device) because it is undesirable for the device to go into this mode when prompted from an illegitimate source. Finally, once the device receives update mode indication along with the update, the first step of the critical update mechanism is to verify the signature using UP.CU.PK.OTS. Only if the signature is verified, the critical update process continues and the update package is decrypted with D.CU.SK.ENC, otherwise the device aborts the update.

Depending on which schemes are implemented on the devices to update and the particular reason the critical update will be required in the future, it might be difficult to predict the exact replacement cryptographic schemes. As a result, more time is required to create the update code. In such a case, it is most likely necessary for the device to not perform any updates using vulnerable cryptography. In addition, it might be advantageous to prompt the device to stop using any vulnerable cryptography for critical applications. This choice is up to the device owner.

The updated system and mechanism disclosed herein can deal with the previous situation by performing a two-stage update. This requires the provisioning of two OTS public keys. A OTS2first public key to verify the dedicated system message to enable the critical update mode and disable any updates using vulnerable cryptographic schemes, and a second public key to verify the eventual, valid update package. FIG. 2 illustrates a two stage update system and method. Again, the steps taken after the device has received the command is up to the device owner and out of the scope of this disclosure.

To simplify the previous description and diagrams, a single one-time update or a two-stage process was considered. These proposed mechanisms may be extended to accommodate multiple updates. Because this disclosure deals with the particular case of critical updates, it is expected that the number of such updates will be small. Consider that the aim is to deal with m such updates, because OTS secret keys can only sign a single message, the previous mechanism may be extended by provisioning the device with m UP.CU.PK.OTS keys. This corresponds to 56m bytes for the public verification keys but the same code impact as in the case of just a single update. It is noted that while a 56 byte key is used for illustrations, other size keys may be used as well.

Another option to avoid provisioning all OTS public keys, is to construct a small hash tree with m leaves (e.g., to accommodate m=8 critical updates, a small hash tree of height h=3 may be constructed). This allows for the signing of m updates while only provisioning a single 56-byte public key. This however increases the size of the update's signature and the complexity and code size of its verification. The m=8 OTS keys can be used to sign both commands to enable the critical mode and the update packages.

Naturally, devices that already implement hash-based signatures for the standard update setting can simply use the same hash tree. In this ID we are mostly concerned with devices that do not implement full-fledged hash-based signatures such as LMS, XMSS or SPHINCS+ or if standard updates do not use hash-based signatures e.g., due to statefulness, the impossibility of key backup, overhead concerns or any other practical or technical reason.

First two OTS secret keys UP.CU.SK.OTS1 and UP.CU.SK.OTS2 are generated by the update provider 210, then the corresponding public keys i.e., UP.CU.PK.OTS1 and UP.CU.PK.OTS2 are provisioned on the device 205. Also a symmetric secret key D.CU.SK.ENC is provisioned on the device 205 and the update provider 210. Code to run the OTS verification is also provisioned on the device 205.

Next, at 220, a critical mode is enabled and use of any vulnerable cryptography for updates is disabled. The update provider generates a signature Signature1 using the secret key UP.CU.SK.OTS1. At 230, the update provider 210 sends an update mode command and a Signature1 to the device 205. The device 205 verifies the receipt of the update mode command using Signature1 from the update provider 210 and the key UP.CU.PK.OTS1.

Once Signature1 is verified, at 225, the critical update is installed. The update provider 210 prepares an update package EncPackage by encrypting the Package using the secret key UP.CU.SK.ENC. The update provider 210 also generates a signature Signature2 using the encrypted package EncPackage and secret key UP.CU.SK.OTS2. At 235, the update provider 210 sends the encrypted package EncPackage and Signature2 to the device 205. The device 205 verifies Signature2 using the public key UP.CU.PK.OTS2. Then the device 205 decrypts EncPackage using the secret key D.CU.SK.ENC to produce the Package that is then installed on device 205.

Next, a mechanism to refresh the symmetric encryption key D.CU.SK.ENC is described. This is useful if reusing the same symmetric key for all critical updates is not desirable. This refreshing includes deriving a new symmetric key from D.CU.SK.ENC and a random secret value r sent encrypted along with the first update using a function F as follows:

$$D\cdot CU\cdot SK\cdot ENC=F(D\cdot CU\cdot SK\cdot ENC,\ r).$$

This new key overwrites the previous D.CU.SK.ENC. The function F needs to be efficient to compute (F) and difficult to invert ($F^{-1}$), meaning that good candidates for usage are hash functions such as SHA-2 and SHA-3 and key derivation functions such as HKDF, but other one-way functions that may be calculated within the processing constraints of the device may also be used. What this solution offers is forward secrecy of the update. If the current D. CU. SK. ENC key is recovered by an attacker, then the previous updates' confidentiality is maintained thanks to the one-way properties of the function.

This mechanism introduces an operational challenge in the case where updates are "offline", meaning that they are broadcast or published somewhere for devices to retrieve. In this case, the server entity providing the updates cannot be sure that all devices have received a critical update before broadcasting/publishing the next update package, and in turn this means that the server cannot be certain that all devices have moved on from the previous value of D. CU. SK. ENC. A solution to this is for each update package to include not just the r value required, but also all prior values of r that have been used. Then, any device can perform the correct number of iterations of F with the appropriate r values to get to the most recent symmetric key.

Next, attesting to new credentials is described. As has been described, the seed updater mechanism can be used to generate secret keying material for the replacement scheme. However it may be necessary—for compliance or other reasons—for the device to randomly generate its own keys for the replacement scheme. In this case, it is necessary for the device to distribute its new public key, and to prove to the server and other devices in its network that it is in fact the same device as before (yet holding a new key). In order to stop impersonation attacks, this can be done using an attestation mechanism where the secure environment produces a cryptographic signature about certain device details including its identifier(s).

In the case that this signature scheme has become vulnerable, it is possible to use the provisioned symmetric key D. CU. SK. ENC to securely transmit an authentication request to sign the new public key: the server would then respond with a certificate on the new public key. The issue here is that this only works if the update provider is the same entity that signs operational credentials (or the credential-signing entity is trusted with these symmetric keys).

Figure 3:
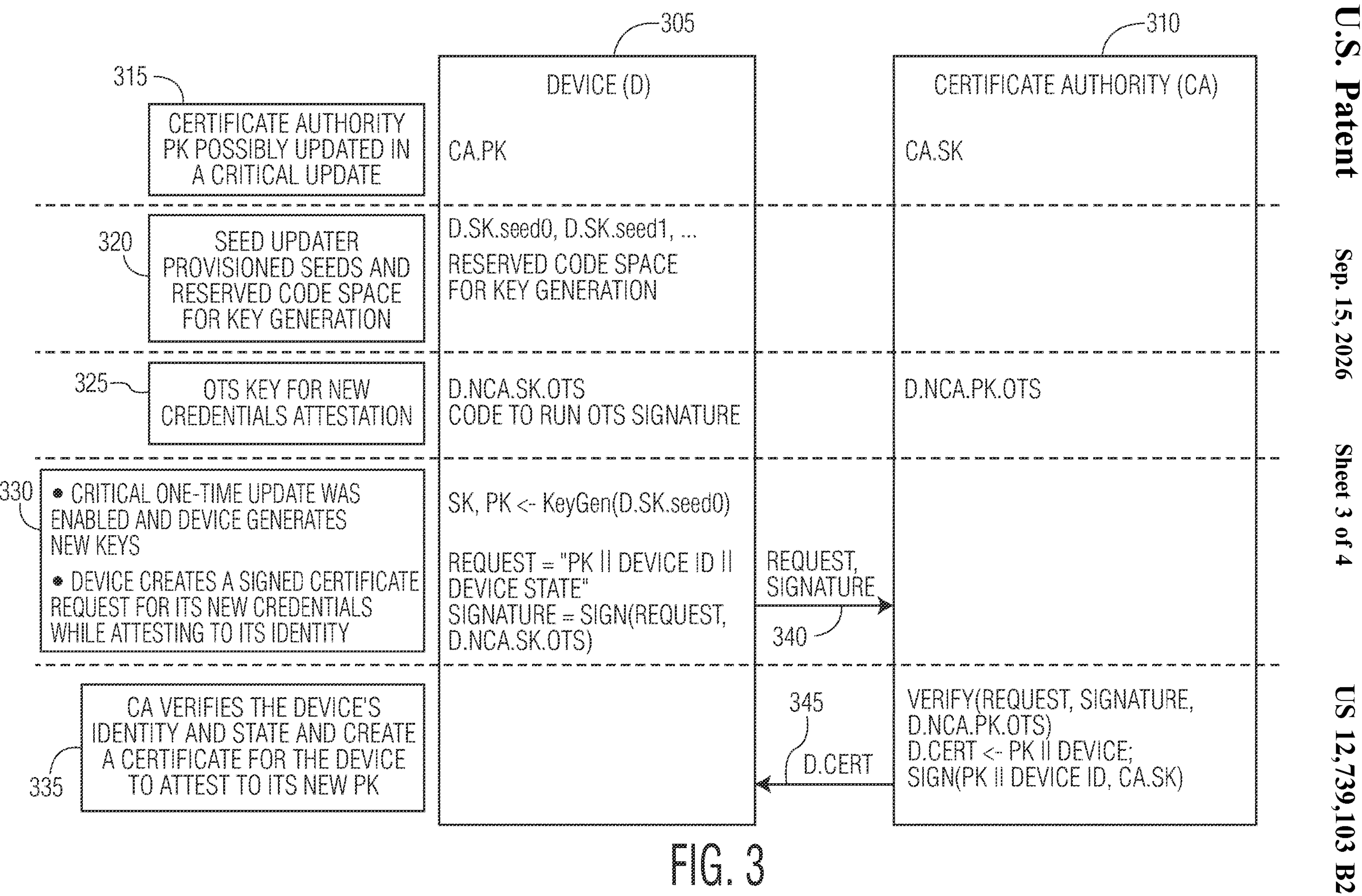
FIG. 3 describes a process of attesting to and requesting certificates for new keys or credentials.

An alternative approach is for the device to use a one-time signature scheme to sign the new public key (and the device identifier, etc.) to attest to the new credentials in a secure way. This option requires that the appropriate server entities hold the one-time public key that is associated with the OTS signing key. If this option is enabled then this OTS signing key could be derived from a single seed, as described above. FIG. 3 describes a process of attesting to and requesting certificates for new keys or credentials. This mechanism may have a single seed that is used to derive the OTS secret keys and the symmetric key.

At 315, a certificate authority public key is possibly updated on the device during a critical update. The device 305 has the public key CA.PK of the certificate authority 310 provisioned therein. The certificate authority 310 stores its secret key CA.SK. At 320, a seed updater provisions seeds and reserved code space for key generation on the device 205. Next, at 325, an OTS secret key D.NCA.SK.OTS and code to run the OTS signature process is provisioned on the device 205. The public key D.NCA.PK.OTS is also provided to the certificate authority 310.

At 330, a critical one-time update is enabled and the device 305 generates new keys. Also, the device 305 creates a signed certificate request using the secret key D.NCA.SK.OTS for its new credentials while attesting to its identity. At 340, the device 305 sends the request and signature to the certificate authority 310. At 335, the certificate authority 310 verifies that device's identity and state and then creates a certificate for the device 305 to attest to its new public key. At 345, the certificate authority 310 sends the certificate D.Cert to the device 305.

Initial NVM loading in manufacturing with post-quantum security will now be described. The same update mechanism for critical updates that has been described above may additionally be leveraged for the device's initial Non-Volatile Memory (NVM) initialization during manufacturing. At this time the device only contains valid immutable Read Only Memory (ROM) content, which in addition to basic functionality, holds the limited time signature verification scheme, loading/update code and the initial verification and decryption keys. In many currently deployed solutions, this integrity check is done using either symmetric encryption or traditional digital signature algorithms such as ECDSA (where the encryption key or the ECDSA verification key are loaded into ROM). In the first case the compromise of one device results in the ability of that adversary to load arbitrary software to all devices (that share the symmetric key), and in the second case the procedure is vulnerable in the presence of a quantum computer. To avoid both of these pitfalls, the integrity protection could be provided by a hash-based signature scheme for which the one-time signature sub-component is already installed in the critical update module: for example the OS loading could be signed with LMS or XMSS if LM-OTS and WOTS are in the critical update module respectively. The benefit of this approach, in addition to conservative post-quantum security, is a reduction in ROM code size compared with having separate signature verification algorithms for the OS loading and critical updates, respectively. The asymmetric signature would serve the purpose of authenticating an (initial) loading procedure as well as integrity protecting the loaded content. The confidentiality protection would remain with a symmetric cipher. After loading of the initial content, the initial immutable keys can be exchanged for keys loaded in modifiable (RAM/NVM) memory and may be changed multiple times within one loading procedure.

Detecting compromise during the critical update loading process will now be described. The critical update concept is described as a mechanism for replacing a scheme that is broken by a new cryptanalytic attack or the invention of a powerful-enough quantum computer, which leaves open the possibility that a device could be compromised by an adversary in between the breakthrough and the deployment of the critical update. Such an adversary that can break the existing update cryptography (in particular by calculating a secret signing key from a public verification key) can therefore gain complete access to the device by installing their own software or firmware updates. This makes it important to be able to detect such a loading of unauthorized updates, wherever possible, and simply aborting the update process if such an update is detected.

A method to detect updates is to store a tamper-proof monotonically increasing counter that captures which update version the device currently holds. The counter itself could be stored in fuses, while the code for this mechanism could be in ROM: this way an adversary—even one with access to cryptographic keying material of the update mechanism—cannot revert this counter to a prior value. When a critical update is loaded, if the counter value is higher than the value that the update initiator has declared, then the device will not install the critical update and will report this failure to the system manager so that the device can be marked as compromised and removed from use. Instead of a counter, it may also be viable for the device to provide more detailed feedback including for example a hash of its current software version and update history, so long as this message cannot be forged by an adversary already in control of the device. Such a flexible/modular approach may be useful to provide an indication of post-quantum readiness of the device.

Figure 4:
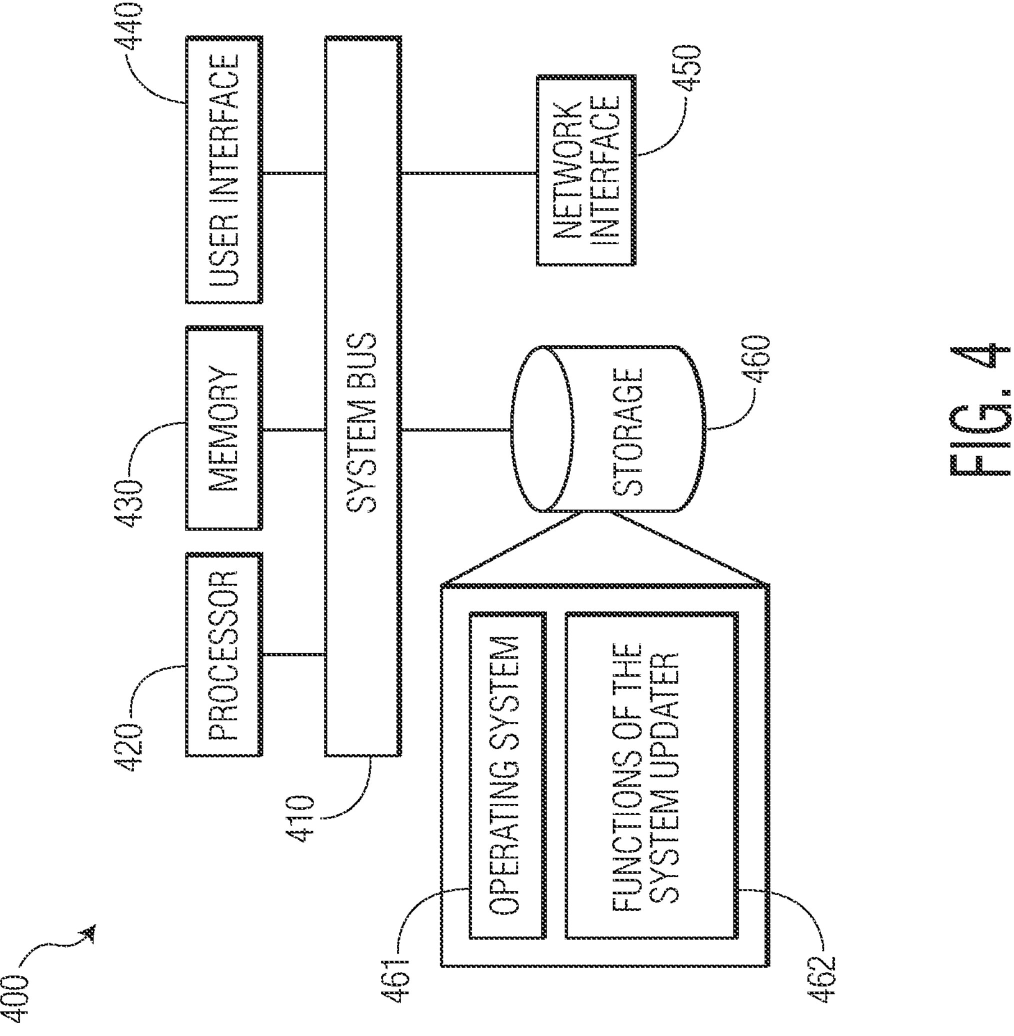
FIG. 4 illustrates an exemplary hardware diagram for implementing an updater system as described in FIGS. 1-3.

FIG. 4 illustrates an exemplary hardware diagram 400 for implementing an updater system as described in FIGS. 1-3. The exemplary hardware 400 may correspond to the devices 105, 205, 305, update provider 110, 210, or certificate authority 310. As shown, the device 400 includes a processor 420, memory 430, user interface 440, network interface 450, and storage 460 interconnected via one or more system buses 410. It will be understood that FIG. 4 constitutes, in some respects, an abstraction and that the actual organization of the components of the device 400 may be more complex than illustrated.

The processor 420 may be any hardware device capable of executing instructions stored in memory 430 or storage 460 or otherwise processing data. As such, the processor may include a microprocessor, microcontroller, graphics processing unit (GPU), neural network processor, field programmable gate array (FPGA), application-specific integrated circuit (ASIC), or other similar devices. The processor may be a secure processor or include a secure processing portion or core that resists tampering.

The memory 430 may include various memories such as, for example L1, L2, or L3 cache or system memory. As such, the memory 430 may include static random-access memory (SRAM), dynamic RAM (DRAM), flash memory, read only memory (ROM), or other similar memory devices. Further, some portion or all of the memory may be secure memory with limited authorized access and that is tamper resistant.

The user interface 440 may include one or more devices for enabling communication with a user such as an administrator. For example, the user interface 440 may include a display, a touch interface, a mouse, and/or a keyboard for receiving user commands. In some embodiments, the user interface 440 may include a command line interface or graphical user interface that may be presented to a remote terminal via the network interface 450.

The network interface 450 may include one or more devices for enabling communication with other hardware devices. For example, the network interface 450 may include a network interface card (NIC) configured to communicate according to the Ethernet protocol or other communications protocols, including wireless protocols. Additionally, the network interface 450 may implement a TCP/IP stack for communication according to the TCP/IP protocols. Various alternative or additional hardware or configurations for the network interface 450 will be apparent.

The storage 460 may include one or more machine-readable storage media such as read-only memory (ROM), random-access memory (RAM), magnetic disk storage media, optical storage media, flash-memory devices, or similar storage media. In various embodiments, the storage 460 may store instructions for execution by the processor 420 or data upon with the processor 420 may operate. For example, the storage 460 may store a base operating system as well as application software 461 for controlling various basic operations of the hardware 400. Storage 462 may include instructions for carrying out the functions of the updater system described herein.

It will be apparent that various information described as stored in the storage 460 may be additionally or alternatively stored in the memory 430. In this respect, the memory 430 may also be considered to constitute a "storage device" and the storage 460 may be considered a "memory." Various other arrangements will be apparent. Further, the memory 430 and storage 460 may both be considered to be "non-transitory machine-readable media." As used herein, the term "non-transitory" will be understood to exclude transitory signals but to include all forms of storage, including both volatile and non-volatile memories.

The system bus 410 allows communication between the processor 420, memory 430, user interface 440, storage 460, and network interface 450.

While the host device 400 is shown as including one of each described component, the various components may be duplicated in various embodiments. For example, the processor 420 may include multiple microprocessors that are configured to independently execute the methods described herein or are configured to perform steps or subroutines of the methods described herein such that the multiple processors cooperate to achieve the functionality described herein. Further, where the device 400 is implemented in a cloud computing system, the various hardware components may belong to separate physical systems. For example, the processor 420 may include a first processor in a first server and a second processor in a second server.

The foregoing disclosure provides illustration and description but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, the term "non-transitory machine-readable storage medium" will be understood to exclude a transitory propagation signal but to include all forms of volatile and non-volatile memory. When software is implemented on a processor, the combination of software and processor becomes a specific dedicated machine.

Because the data processing implementing the embodiments described herein is, for the most part, composed of electronic components and circuits known to those skilled in the art, circuit details will not be explained in any greater extent than that considered necessary as illustrated above, for the understanding and appreciation of the underlying concepts of the aspects described herein and in order not to obfuscate or distract from the teachings of the aspects described herein.

Unless stated otherwise, terms such as "first" and "second" are used to arbitrarily distinguish between the elements such terms describe. Thus, these terms are not necessarily intended to indicate temporal or other prioritization of such elements.

It should be appreciated by those skilled in the art that any block diagrams herein represent conceptual views of illustrative hardware embodying the principles of the aspects.

While each of the embodiments are described above in terms of their structural arrangements, it should be appreciated that the aspects also cover the associated methods of using the embodiments described above.

Unless otherwise indicated, all numbers expressing parameter values and so forth used in the specification and claims are to be understood as being modified in all instances by the term "about." Accordingly, unless indicated to the contrary, the numerical parameters set forth in this specification and attached claims are approximations that may vary depending upon the desired properties sought to be obtained by embodiments of the present disclosure. As used herein, "about" may be understood by persons of ordinary skill in the art and can vary to some extent depending upon the context in which it is used. If there are uses of the term which are not clear to persons of ordinary skill in the art, given the context in which it is used, "about" may mean up to plus or minus 10% of the particular term.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method for updating a device, the method comprising:

during a provisioning process:

receiving, by the device, a public one-time signature (OTS) key;

receiving, by the device, a secret encryption key; and provisioning code to run a one-time signature verification in the device; and during an update process:

receiving at least one signed message including an encrypted update package and a command to enable a critical update mode from an update provider;

verifying the signature using the public OTS key;

when the signature is verified, enabling the critical update mode;

decrypting the encrypted update package using the secret encryption key; and updating the device using the decrypted update package.

2. The method of claim 1, wherein, during the provisioning process, the method further comprising;

provisioning the device with a secret seed; and reserving code space in the device for key generation using the secret seed.

3. A method for updating a device by an update provider, the method comprising:

sending, by the update provider to the device, a critical update mode command signed using a first public one-time signature (OTS) key;

encrypting an update package using a secret encryption key;

signing a message including the encrypted update package using a second secret one-time signature key; and sending the signed message including the encrypted update package to the device to update or replace code stored on the device to perform one or more cryptographic operations, the one or more cryptographic operations including a one-time signature verification operation.

4. A method for updating a device, the method comprising:

during a provisioning process:

receiving, by the device, a first public one-time signature key and a second public one-time signature key;

receiving, by the device, a secret encryption key;

receiving, by the device, code to perform one or more cryptographic operations on the device, the one or more cryptographic operations including a one-time signature verification;

during a critical update process:

receiving, by the device, an update mode message and a first signature;

verifying, by the device, the first signature using the first public one-time signature key;

in response to verifying the first signature, entering, by the device, a critical update mode;

receiving, by the device, an encrypted update package and a second signature from an update provider;

verifying, by the device, the second signature using the second public one-time signature key;

in response to verifying the second signature, decrypting, by the device, the encrypted update package using the secret encryption key; and updating, by the device, the code on the device using the decrypted update package.

5. A method for updating a device by an update provider, the method comprising:

during a provisioning process:

sending a first public one-time signature key and a second public one-time signature key to the device;

sending a secret encryption key; and sending code to the device, the code configured to cause the device to perform one or more cryptographic operations, the one or more cryptographic operations including a one-time signature verification operation;

during a critical update process:

producing a first signature of an update mode message using a first secret one-time signature key corresponding to the first public one-time signature key;

sending the update mode message and the first signature to the device to cause the device to enter a critical update mode;

encrypting an update package using the secret encryption key, the update package including update code to update or replace the code on the device;

producing a second signature of the encrypted update package using a second secret one-time signature key corresponding to the second public one-time signature key; and sending the encrypted update package and second signature to the device.

6. A method for requesting a certificate by an updated device, the method comprising:

receiving, by the updated device, a public certification authority signature key;

receiving, by the updated device, a secret one-time signature key;

generating a new updated device secret key and public key;

producing a signature request for the new updated device public key;

producing a first signature of the signature request using the secret one-time signature key;

sending the signature request and the first signature to a certification authority; and receiving a certificate including a signature of the certificate from the certification authority.

7. The method of claim 6, further comprising:

provisioning the updated device with a secret seed; and reserving code space in the updated device for key generation using the secret seed.

8. The method of claim 6, further comprising:

provisioning code to run a one-time signature verification in the updated device.

9. The method of claim 6, wherein the first signature is based on a secret certification authority signature key.

10. A method for generating a certificate for an updated device, the method comprising:

sending a public certification authority signature key to the updated device;

sending a secret one-time signature key to the updated device;

receiving a certificate request for a new updated device public key and a first signature for the certificate request from the updated device, wherein the first signature is based on the secret one-time signature key;

verifying the first signature and the certificate request;

producing a certificate for the new updated device public key including a second signature of the certificate using a secret certification authority signature key corresponding to the public certification authority signature key; and sending the certificate and second signature to the updated device.

11. The method of claim 1, wherein, during the provisioning process, receiving, by the device, the public OTS key, comprises:

receiving, by the device, a first public OTS key and a second public OTS key.

12. The method of claim 11, wherein the at least one signed message includes a first message signed by a first OTS key and including the command and a second message signed by a second OTS key and including the encrypted update package.

13. The method of claim 12, further comprising:

receiving, by the device, the first message;

verifying the first message using the first public OTS key;

in response to verifying the first message:

enabling the critical update mode based on the command of the first message; and disabling any updates that utilize current cryptographic schemes;

receiving, by the device, the second message;

verifying the second message using the second public OTS key; and in response to verifying the second message, decrypting the encrypted update package using the secret encryption key; and updating the device using the decrypted update package.

14. The method of claim 1, further comprising:

provisioning the device with a secret seed; and reserving code space in the device for key generation using the secret seed.

15. The method of claim 3, wherein, during a provisioning process that is performed before sending the critical update mode command, the method comprises:

provisioning the device with the first public OTS key and the second public OTS key;

provisioning the device with the secret encryption key; and provisioning code to perform one or more cryptographic operations on the device, the one or more operations including a one-time signature verification operation.

16. The method of claim 3, further comprising:

provisioning the device with a secret seed; and reserving code space in the device for key generation using the secret seed.

17. The method of claim 4, wherein in response to verifying the first signature, the method further comprises disabling any updates that utilize the code to perform the one or more cryptographic operations.

18. The method of claim 4, further comprising:

provisioning the device with a secret seed; and reserving code space in the device for key generation using the secret seed.

* * * * *